(12) United States Patent
Allen et al.

(10) Patent No.: US 11,035,456 B1
(45) Date of Patent: Jun. 15, 2021

(54) GEAR CASING OIL DIVERTER

(71) Applicant: Amarillo Gear Company LLC, Amarillo, TX (US)

(72) Inventors: Michael Allen, Amarillo, TX (US); Harrison Fry, Amarillo, TX (US)

(73) Assignee: Amarillo Gear Company LLC, Amarillo, TX (US)

( * ) Notice: Subject to any disclaimer, the term of this patent is extended or adjusted under 35 U.S.C. 154(b) by 0 days.

(21) Appl. No.: 16/937,102

(22) Filed: Jul. 23, 2020

(51) Int. Cl.
F16H 57/04 (2010.01)
F16H 57/029 (2012.01)

(52) U.S. Cl.
CPC ....... *F16H 57/029* (2013.01); *F16H 57/0424* (2013.01)

(58) Field of Classification Search
CPC ............... F16H 57/029; F16H 57/0424; F16H 57/0423; F16H 57/0471; F16H 57/0469
See application file for complete search history.

(56) References Cited

U.S. PATENT DOCUMENTS

2010/0102514 A1* 4/2010 Lipot ............... H02K 5/124 277/412
2015/0159697 A1* 6/2015 Fischer ............ F16C 33/664 384/462

FOREIGN PATENT DOCUMENTS

DE 3330473 A1 * 5/1984 ............ F16C 35/077

* cited by examiner

Primary Examiner — Luis A Gonzalez
(74) Attorney, Agent, or Firm — Levenfeld Pearlstein, LLC

(57) ABSTRACT

A gearbox includes a main housing carrying input and output shafts, a carrier mounted to the housing having a bore, an isolator plate mounted to the carrier having a bore aligned with the carrier bore, and an isolator mounted to the isolator plate having a bore aligned with the isolator plate and carrier bores. The carrier includes an oil collection well, spaced from the bore, and an oil return channel in fluid communication with the oil collection well that extends through the carrier to the main housing. The isolator plate includes an interior surface and an oil passage formed therein that extends from the interior surface to the oil collection well, such that the interior surface is in fluid communication with the main housing via the oil passage, the oil collection well and the oil return channel, and fluid at the interior surface is drawn into the main housing via the oil passage, the oil collection well and the oil return channel.

20 Claims, 5 Drawing Sheets

GEAR CASING OIL DIVERTER

BACKGROUND

The present disclosure relates to an oil diverter for a gearbox, and more particularly, to a system to prevent oil leakage by diverting oil from a shaft penetration back into the gear casing.

Gearing is often used between a driver and a driven component to, for example, change the speed or torque of the driver to a speed or torque needed for the driven component. For example, gearing can be used between a motor and a fan to drive the fan at a different speed than the motor output.

Such gearing is incorporated into a gearbox and is often contained in a gear casing or housing. The internal components of a gearbox such as gears as bearings require lubrication to reduce friction, wear, and heat. The lubricating medium, typically gear oil, is often circulated within the housing by either forced or passive methods, such as an oil pump or splash lubrication, respectively.

In most gear systems or gearboxes, there are penetrations or openings in the housings through which input and/or output shafts traverse. In order to prevent oil from leaking through the rotating shaft penetrations, various sealing mechanisms, such as radial lip seals, mechanical seals or non-contacting bearing isolators are used at the penetration. However, radial lip seals and mechanical seals require direct contact with the rotating shaft, resulting in a wear item that often leaks and requires frequent replacement. While non-contacting bearing isolators do not wear, they often leak when used in splash lubrication applications. This is especially true when the gear casing is oriented such that a shaft utilizing a non-contact bearing isolator is oriented in a horizontal plane.

One way to address oil leakage issues with non-contacting bearing isolator is to contain or "catch" any oil that leaks from the shaft penetration. This can result in, among other things, environmental contamination, waste of lubricant, and catastrophic failure from loss of oil. Another way in which to address oil leakage is to use external systems, for example, tubing, to collect the oil and redirect it to an auxiliary or main oil reservoir.

Accordingly, there is a need for a system to prevent oil from leaking through rotating shaft penetrations in gear casings that utilize non-contacting bearing isolators. Desirably, such a system is a passive system. More desirably still, such a system reduces contamination and waste, diverting the lubricating oil back into the gearbox.

SUMMARY

In one aspect of the present disclosure, a gearbox includes a main housing or case, as well as ancillary housings or carriers that, in conjunction, support an input shaft and an output shaft. A carrier generally serves as secondary housing that supports a shaft assembly and is mounted to the main housing via, for example, a bolted connection. The carrier is mounted to the main housing and has a bore through which the input or output shaft extends. An isolator plate is mounted to the carrier and has a bore aligned with the carrier bore through which the input or output shaft extends. A non-contacting bearing isolator is mounted to the isolator plate and has a bore aligned with the isolator plate bore, through which the input or output shaft extends. The gearbox can include intermediate stages of gearing that do not require external penetrations.

In an embodiment, the carrier includes an oil collection well spaced from the shaft bore and an oil return channel in fluid communication with the oil collection well and a main oil reservoir. The channel extends through the carrier to the main housing.

The isolator plate includes an isolation dam having a primary oil passage formed therein. The primary oil passage, located on the rearward or inboard side of the isolator plate, extends from the interior surface of the isolator dam to the oil collection well, and is in fluid communication with the main housing via the oil collection well and the oil return channel. Fluid at the interior surface of the isolation dam is drawn into the main housing via the primary oil passage, the oil collection well and the oil return channel.

The oil diverter system includes an integral isolation dam in the isolator plate that restricts the volume of oil that reaches the rearward or inboard side of the bearing isolator. Oil that passes this barrier is diverted back to the main casing through a series of passages and channels, effectively preventing oil from leaking through rotating shaft penetrations in gear casings.

In an embodiment, a secondary oil passage is an integral passage extending radially downward from the isolator plate bore. The isolator plate can include a radial projection such that the secondary oil passage extends along the projection. In such an embodiment, the projection aligns with the oil collection well of the carrier.

In an embodiment, the carrier includes a projection containing the oil collection well, which is aligned with the isolator plate projection, providing continuity with both isolator plate oil passages. The oil return channel in the carrier is spaced above the bottom of the oil collection well, and can be oriented parallel to or askew the bore. The oil return channel extends from the oil collection well to the main housing reservoir.

In an aspect, an oil diverter system for a gear box is disclosed for a gearbox having a main housing, an input shaft and an output shaft. The oil diverter system includes a secondary housing or carrier mountable to the gearbox main housing. The carrier has a bore through which the input or output shaft extends. An isolator plate is mounted to the carrier and has a bore aligned with the carrier bore through which the input or output shaft extends. An isolator stator is mounted to the isolator plate and has a bore concentric with the isolator plate bore through which the input or output shaft extends. The isolator rotor is secured to the shaft which extends through the aforementioned assembly.

The carrier includes an oil collection well spaced from the shaft bore and an oil return channel in fluid communication with the oil collection well. The oil return channel extends through the carrier to the main housing. In an embodiment, the isolator plate can include a feature that reduces the inner diameter such as a radially inward oriented lip or isolation dam that is disposed adjacent the oil passage. The isolator plate includes the isolation dam, and primary and secondary oil passages formed therein. The primary oil passage extends from the interior surface of the isolation dam to the oil collection well, such that the interior surface is in fluid communication with the main housing via the primary oil passage, the oil collection well and the oil return channel. In such an embodiment, a flow path is defined to draw fluid from the interior surface of the isolation dam into the main housing via the isolator plate primary oil passage, the oil collection well and the oil return channel.

In an embodiment, the secondary oil passage is an integral passage radially extending from the bore formed in the isolator plate. The isolator plate can include a projection such that the secondary oil passage extends along the projection. The projection can align with the oil collection well.

In an embodiment, the carrier includes a projection containing the oil collection well, which is aligned with the isolator plate projection providing continuity with both isolator plate oil passages. The oil return channel in the carrier can be spaced above the bottom of the oil collection well. The channel can be oriented parallel to or askew of the bore.

In another aspect, a gearbox includes a secondary housing, carrying an input shaft and/or an output shaft, mounted to the main housing. An isolator plate is mounted to the carrier and an isolator stator is mounted to the isolator plate. A concentric bore extends through the carrier, the isolator plate and the isolator, through which an input or output shaft passes.

An oil return passage extends from the isolator plate to the main housing. The oil return passage is in communication with the shaft bore and is configured to return oil at the isolator to the main housing.

In an embodiment, the oil return passage communicates with the shaft bore at the isolator plate. The oil return passage can be an integral radially extending channel formed in the isolator plate. The isolator plate can include a feature that reduces the inner diameter such as a radially inward oriented lip that is disposed adjacent the oil passage.

Further understanding of the present disclosure can be obtained by reference to the following detailed description in conjunction with the associated drawings, which are described briefly below.

DESCRIPTION OF THE DRAWINGS

Various embodiments of a system and method to prevent oil from leaking through rotating shaft penetrations by diverting the oil within gear casings are disclosed as examples and are not limited by the figures of the accompanying drawings, in which like references may indicate similar elements and in which.

DETAILED DESCRIPTION

Figure 1A:
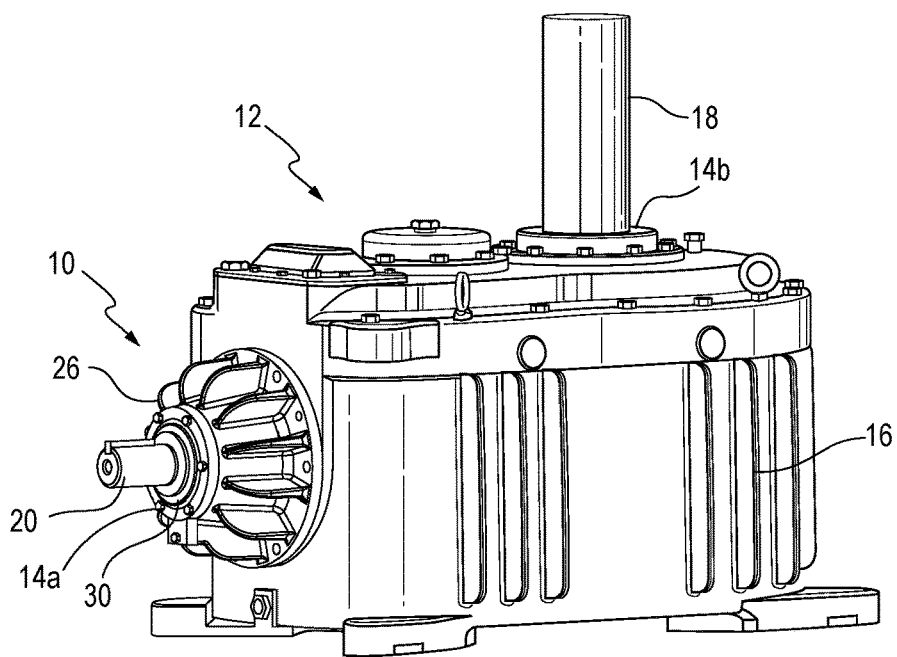
FIGS. 1A and 1B isometric and front views of an example of a gear box having a main and a secondary housing or carrier, having an embodiment of a gear casing oil diverter.

While the present disclosure is susceptible of embodiments in various forms, there is shown in the drawings and will hereinafter be described a presently preferred embodiment with the understanding that the present disclosure is to be considered an exemplification and is not intended to limit the disclosure to the specific embodiment illustrated.

Figure 1B:
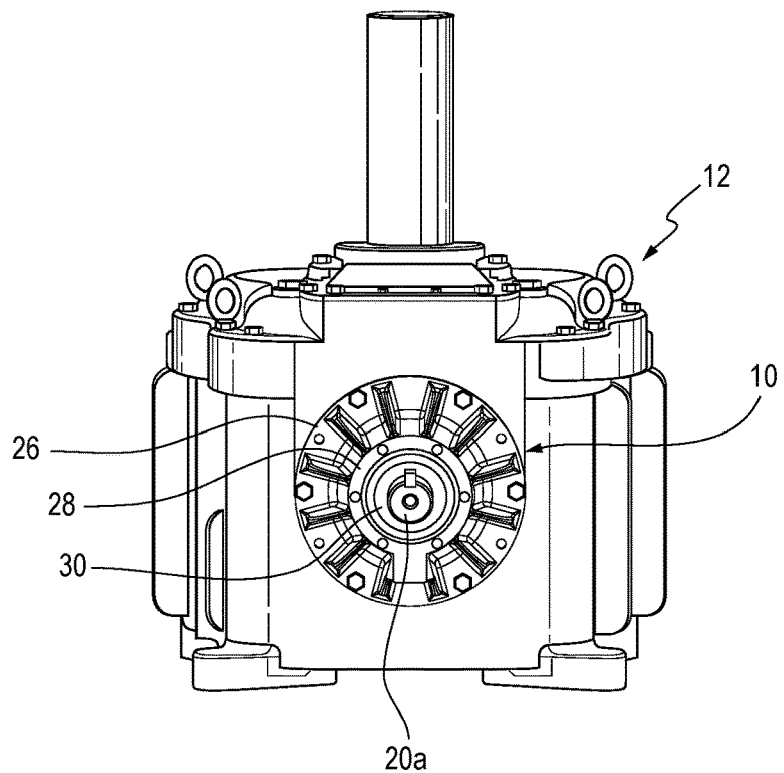
Figure 2:
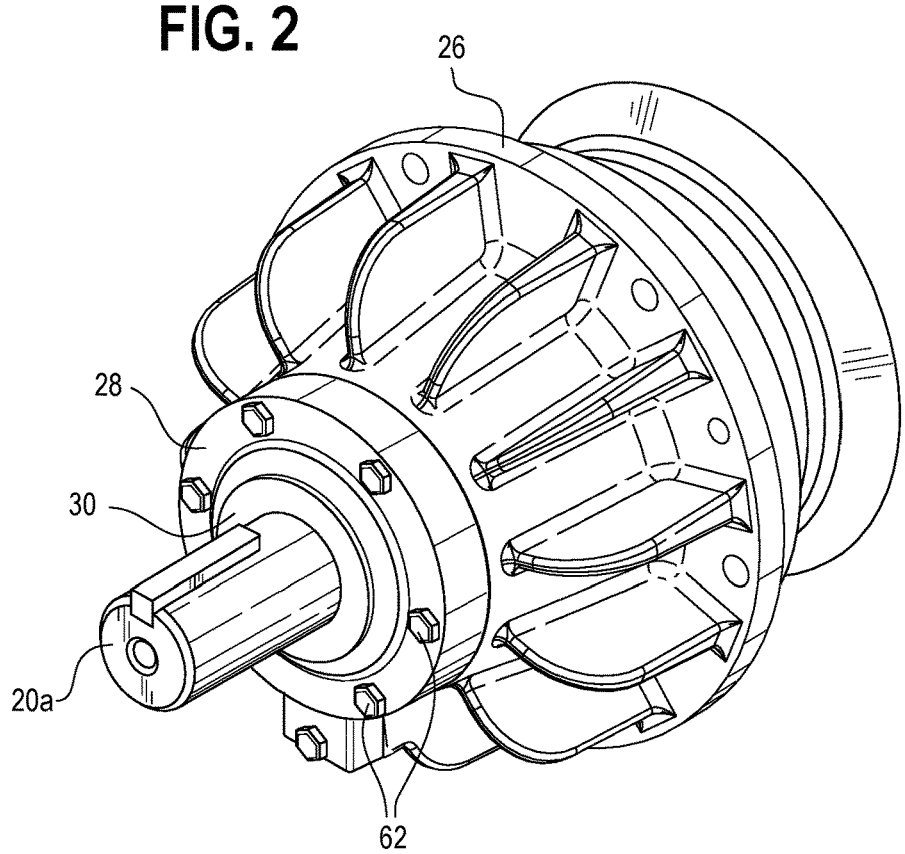
FIG. 2 is an isometric view of a secondary housing, an isolator plate and isolator, and an input shaft extending through the isolator.
Figure 3:
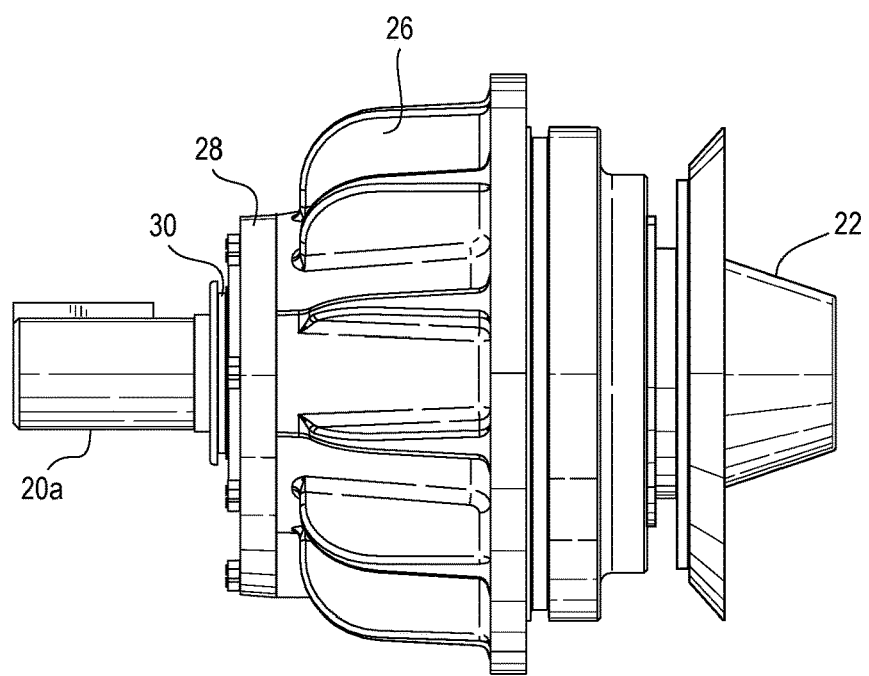
FIG. 3 is a side view of the carrier, isolator plate, isolator, and shaft assembly of FIG. 2.
Figure 4:
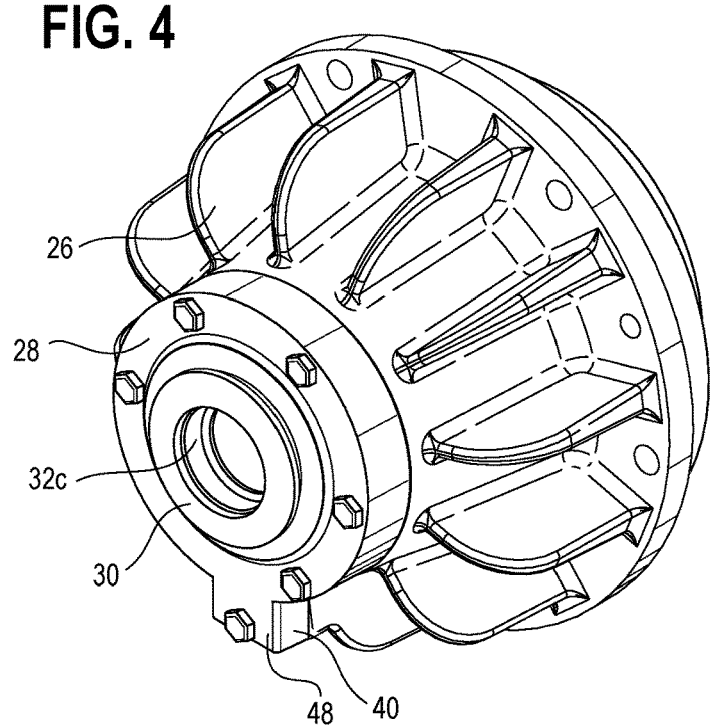
FIG. 4 is a view similar to FIG. 2 with the shaft assembly removed for ease of viewing.

A novel apparatus or system is disclosed to prevent or reduce oil leakage from a gearbox 12 by diverting the oil within the gearbox 12 from areas of the main housing 16 or secondary housing 26 that include penetrations, back into the main housing reservoir. FIGS. 1A and 1B illustrate one example of a gear casing 16 having a system 10 to prevent or reduce oil leakage. For purposes of the present disclosure, the term gearbox 12 refers to the entire assembly including the main casing or housing 16, secondary housing or carrier 26 input and output shafts 18, 20, respectively, all internal components, such as gears 22 and bearings 24 within the casing 16. The terms gear casing, gear housing, casing and housing are used interchangeably, and refer to the enclosure in which the gears 22 and other power transfer components are contained.

Gears 22 and bearings 24 are contained in the housing 16 or secondary housing 26, portions of which are illustrated in FIGS. 2-3 and 8-9. An input shaft 20 is coupled to a motor (not shown) and a driven component such as a fan (not shown) is mounted or coupled to the output shaft 18.

The casing 16 has a secondary housing or horizontal carrier 26, isolator plate 28 and isolator 30 mounted to the casing 16. The carrier 26, isolator plate 28 and isolator 30 provide the penetration 14a through which the input shaft 20 exits the casing 16. The horizontal carrier 26 is mounted to the casing 16, the isolator plate 28 is mounted to the carrier 26 and the isolator 30 is mounted in an opening 32b in the isolator plate 28, as illustrated in FIGS. 2-4 and 8. The isolator 30 serves as a seal apparatus for the input shaft 20. The penetrations or bores 32a, 32b, 32c, respectively in the carrier 26, isolator plate 28 and isolator 30 are all concentric for passage of the shaft 20.

It will be appreciated that the gearbox 12 contains a media, such as oil, that serves as a lubricant for the gears 22 and bearings 24. The oil reduces friction and wear on the loaded rotating components such as the gears 22 and bearings 24, while also providing a cooling medium for the components. The lubricant, for example, oil, can however leak from the main housing 16 or secondary housing 26 at the casing penetrations 14a, 14b. For example, oil can leak from the interface of the input shaft 20 and the isolator 30 or at the isolator/rotor interface. Oil leakage can result in damage to the gearbox 16, or unwanted contamination of the surrounding area.

Figure 5:
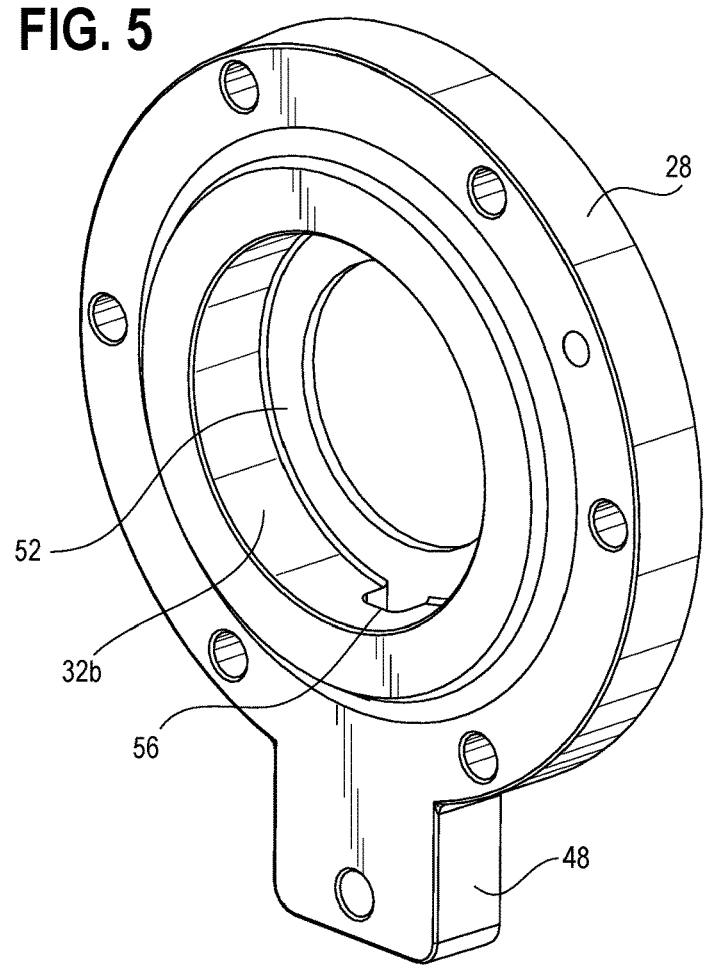
FIG. 5 is an isometric view of the isolator plate removed from the carrier.
Figure 6:
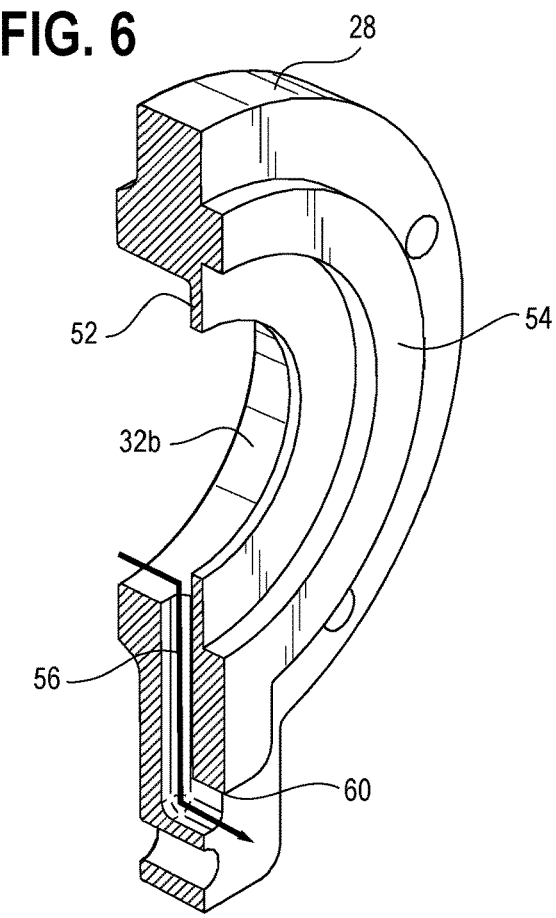
FIG. 6 is a cross-sectional view of the isolator plate.
Figure 7:
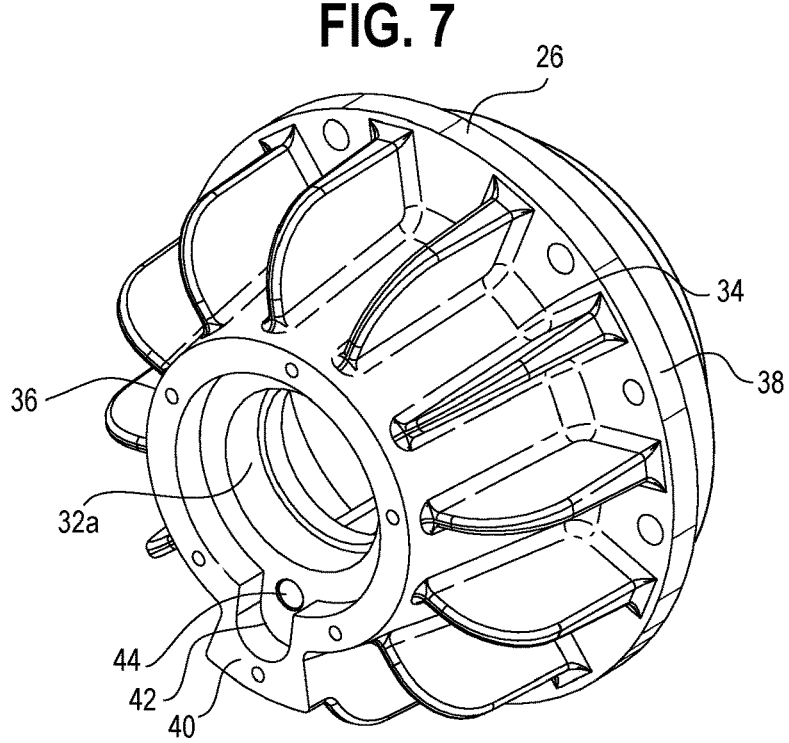
FIG. 7 is a view similar to FIG. 4 with the isolator plate and isolator removed for ease of viewing.
Figure 8:
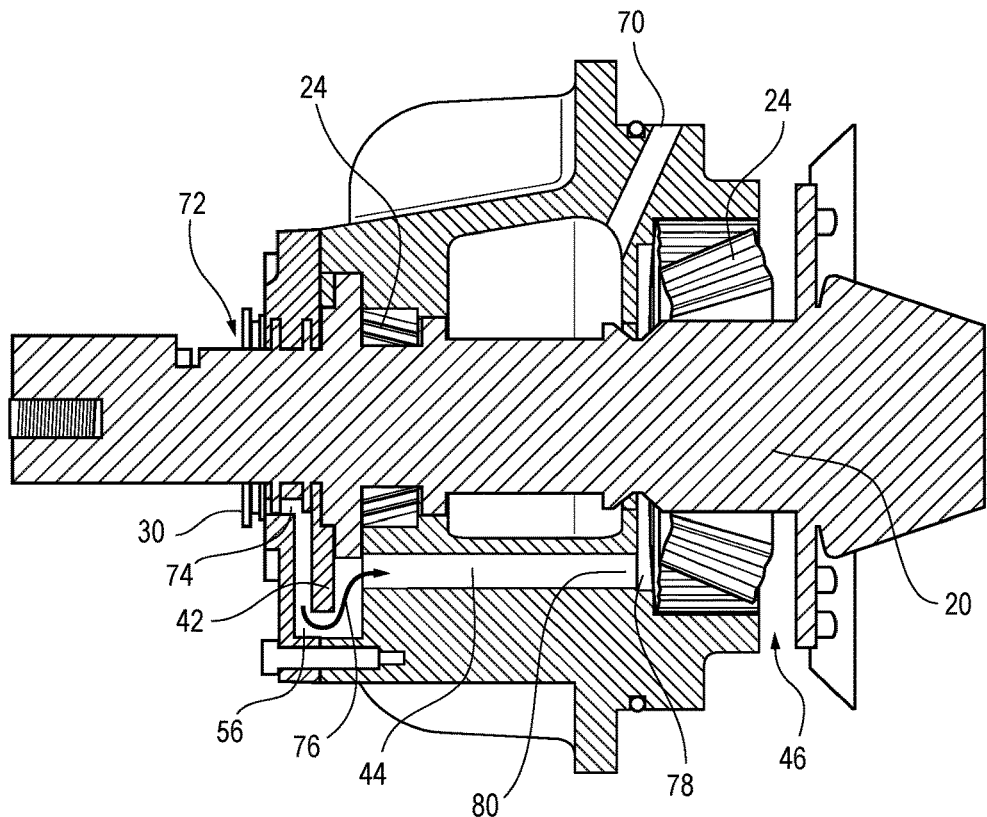
FIG. 8 is a sectional rendering of the carrier, shown with an isolator plate and isolator, and shaft assembly extending through the isolator.
Figure 9:
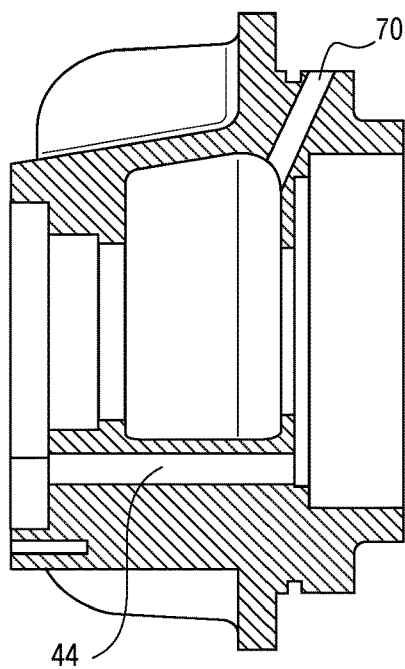
FIG. 9 is a sectional rendering of the horizontal carrier.

To contain the oil in the main housing 16 and secondary housing 26 and to reduce leakage, an embodiment of the present gear casing oil diverter system 10 uses a modified carrier 26 and isolator plate 28, as best seen in FIGS. 5-9. Referring first to FIGS. 7-9, the carrier 26 includes a body 34 that is generally circular in shape and has a forward or outboard end 36 and a rear or inboard end 38. The rear or inboard end 38 is mated with the main housing casing 16 and the isolator plate 28 is mounted to the forward or outboard end 36. An integral oil collection well 42 is formed within the lower radial projection 40. An oil return channel 44 extends from the oil collection well 42 longitudinally through the carrier 26 to provide fluid communication with the main housing 16 of the gearbox 12.

Referring to FIGS. 5, 6 and 8, the isolator plate 28 is generally circular in shape (to mate with the carrier forward end 36) and includes a radial projection 48 such that the isolator plate 28 mounts to and mates with the carrier forward end 36. The isolator plate projection 48 overlies the carrier projection 40 and oil collection well 42. The isolator plate 28 has a thickness $t_{28}$ that defines a concentric bore 32b. A section near the rearward end of the bore 32b has a reduced diameter, creating a lip 52 that serves as an isolation dam to limit the volume of oil allowed into the cavity 74 located immediately behind the isolator 30.

An integral oil passage 56 is formed in the isolator plate 28. In an embodiment, the oil passage 56 is formed as a channel that extends radially downward from the isolator plate bore 32b into the isolator plate projection 48. The oil passage 56 turns rearwardly, toward the rearward end 54 of the isolator plate 28, to an opening 60. The opening 60 aligns with the oil collection well 42 located in the carrier projection 40. In this manner, the isolator plate bore 32b is in fluid communication with the main reservoir of the main housing 16 via the oil passage 56 as it traverses through the isolator plate 28, into the carrier oil collection well 42 and through the carrier oil return channel 44. As best seen in FIG. 8, the oil return channel 44 is at a height $h_{44}$ above that at which the oil passage 56 empties into the oil collection well 42.

In an embodiment, the isolator plate 28 is secured to the carrier forward or outboard end 36 by a series of fasteners 62. The isolator stator is mounted in the isolator plate 28 by an interference fit.

Referring again to FIG. 8, oil is circulated in the gearbox 12 through one or more oil passages, such as passage 70. With respect to the carrier 26, oil flows into and around the bearings 24 and the shafts 18, 20. As such, oil will tend to leak at the penetration 14a of the shaft 20, and more specifically at the interface 72 of the isolator stator and rotor.

As oil flows toward the isolator 30, it is restricted from flowing beyond the isolator plate rearward end 54 by the isolation dam 52 of the plate 28. However, given the fluid nature of oil and the splashing action within the gearbox 12, oil may escape and flow over the isolation dam 52 and into the cavity 74 between the isolator 30 and isolator plate 28.

In the present system, oil that the finds its way into the cavity 74 will not leak from the isolator stator/rotor interface 72. Rather, the oil drains into the oil passage 56 and collects in the oil collection well 42. As the oil fills the oil collection well 42, it will reach the height or elevation of the oil return channel 44 in the carrier 26 and will drain toward the main housing 16, as indicated by the arrow at 76. In addition, the natural pumping action of the bearings 24 draws oil away from the oil return channel 44 and oil collection well 42 to greatly reduce or eliminate leakage at the shaft penetration and isolator stator/rotor interface 72.

It will be appreciated that the presently disclosed system to prevent or reduce oil leakage from a gearbox 12 by diverting the oil within the casing 16 from areas of the casing that include penetrations, for example penetration 72, is presented as an example only. It will be further appreciated that the present system may be used in a wide variety of devices and systems that contain lubricants within a housing and sealed penetrations into such a housing, and that such other systems are within the scope and spirit of the present disclosure.

In the present disclosure, the words "a" or "an" are to be taken to include both the singular and the plural. Conversely, any reference to plural items shall, where appropriate, include the singular. All patents and published applications referred to herein are incorporated by reference in their entirety, whether or not specifically done so within the text of this disclosure.

It will also be appreciated by those skilled in the art that any relative directional terms such as sides, upper, lower, top, bottom, rearward, inboard, forward, outboard and the like may be for explanatory purposes only and may not be intended to limit the scope of the disclosure.

From the foregoing it will be observed that numerous modifications and variations can be made without departing from the true spirit and scope of the novel concepts of the present disclosure. It is to be understood that no limitation with respect to the specific embodiments illustrated is intended or should be inferred.

The invention claimed is:

1. A gearbox comprising:
   a main housing carrying an input shaft and an output shaft;
   a carrier mounted to the main housing, the carrier having a bore, wherein one of the input shaft and the output shaft extends through the bore in the carrier;
   an isolator plate mounted to the carrier and having a bore aligned with the carrier bore, wherein the one of the input shaft and the output shaft extends through the isolator plate bore;
   an isolator mounted to the isolator plate and having a bore aligned with the isolator plate bore, wherein the one of the input shaft and the output shaft extends through the isolator bore;
   wherein the carrier includes an oil collection well, spaced from the carrier bore, and an oil return channel in fluid communication with the oil collection well and extending through the carrier to the main housing,
   wherein the isolator plate includes an interior surface and an oil passage formed therein, the passage extending from the interior surface to the oil collection well, such that the interior surface is in fluid communication with the main housing via the oil passage, the oil collection well and the oil return channel, and
   wherein fluid at the interior surface is drawn into the main housing via the oil passage, the oil collection well and the oil return channel.

2. The gearbox of claim 1, wherein the oil passage is a radially extending passage formed in the isolator plate.

3. The gearbox of claim 1, wherein the isolator plate includes a projection and wherein the oil passage extends along the projection.

4. The gearbox of claim 3, wherein the projection aligns with the oil collection well.

5. The gearbox of claim 1, wherein the isolator plate includes a radially inward oriented lip, the lip disposed adjacent the oil passage.

6. The gearbox of claim 1, wherein the oil return channel is spaced from a bottom of the oil collection well.

7. The gearbox of claim 1, wherein the oil return channel is oriented parallel to or askew of the carrier bore.

8. The gearbox of claim 3, wherein the carrier includes a projection aligned with the isolator plate projection, and wherein the oil collection well is formed in the carrier projection.

9. An oil diverter system for a gear box having a housing, an input shaft and an output shaft, comprising:
   a carrier mountable to the gearbox housing, the carrier having a bore, wherein one of the input shaft and the output shaft extends through the bore in the carrier;
   an isolator plate mounted to the carrier and having a bore aligned with the carrier bore, wherein the one of the input shaft and the output shaft extends through the isolator plate bore;
   an isolator mounted to the isolator plate and having a bore aligned with the isolator plate bore, wherein the one of the input shaft and the output shaft extends through the isolator bore;
   wherein the carrier includes an oil collection well spaced from the carrier bore and an oil return channel in fluid communication with the oil collection well and extending through the carrier to a main housing, wherein the isolator plate includes an interior surface and an oil passage formed therein, the passage extending from the interior surface to the oil collection well, such that the interior surface is in fluid communication with the main housing via the oil passage, the oil collection well and the oil return channel, and wherein a flow path is defined to draw fluid from the interior surface into the main housing via the oil passage, the oil collection well and the oil return channel.

10. The oil diverter system of claim 9, wherein the oil passage is a radially extending passage formed in the isolator plate.

11. The oil diverter system of claim 9, wherein the isolator plate includes a projection and wherein the oil passage extends along the projection.

12. The oil diverter system of claim 11, wherein the projection aligns with the oil collection well.

13. The oil diverter system of claim 9, wherein the isolator plate includes a radially inward oriented lip, the lip disposed adjacent the oil passage.

14. The oil diverter system of claim 9, wherein the oil return channel is spaced from a bottom of the oil collection well.

15. The oil diverter system of claim 9, wherein the oil return channel is oriented parallel to or askew of the carrier bore.

16. The oil diverter system of claim 11, wherein the carrier includes a projection aligned with the isolator plate projection, and wherein the oil collection well is formed in the carrier projection.

17. A gearbox comprising:
- a main housing carrying an input shaft and an output shaft;
- a carrier mounted to the main housing;
- an isolator plate mounted to the carrier;
- an isolator mounted to the isolator plate;
- a shaft bore extending through the carrier, the isolator plate and the isolator, the shaft bore receiving one of the input shaft and the output shaft; and
- an oil return passage extending from the isolator plate to the main housing, the oil return passage in communication with the shaft bore and configured to return oil at the isolator to the main housing.

18. The gearbox of claim 17, wherein the oil return passage communicates with the shaft bore at the isolator plate.

19. The gearbox of claim 17, wherein a portion of the oil return passage is a radially extending passage formed in the isolator plate.

20. The gearbox of claim 17, wherein the isolator plate includes a radially inward oriented lip, the lip disposed adjacent the oil passage.

* * * * *